(12) United States Patent
Milton et al.

(10) Patent No.: US 11,553,007 B2
(45) Date of Patent: Jan. 10, 2023

(54) MULTIPLE LEVEL VALIDATION

(71) Applicant: HEWLETT PACKARD ENTERPRISE DEVELOPMENT LP, Houston, TX (US)

(72) Inventors: Antoni Milton, Santa Clara, CA (US); Mohit Goyal, Santa Clara, CA (US); Pattabhi Attaluri, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 538 days.

(21) Appl. No.: 16/539,549

(22) Filed: Aug. 13, 2019

(65) Prior Publication Data

US 2021/0051182 A1 Feb. 18, 2021

(51) Int. Cl.
*G06F 7/04* (2006.01)
*G06F 15/16* (2006.01)
*G06F 17/30* (2006.01)
*H04L 29/06* (2006.01)
*H04L 9/40* (2022.01)

(52) U.S. Cl.
CPC ........ *H04L 63/205* (2013.01); *H04L 63/0272* (2013.01); *H04L 63/0823* (2013.01); *H04L 63/105* (2013.01); *H04L 63/166* (2013.01)

(58) Field of Classification Search
CPC ............... H04L 63/205; H04L 63/0272; H04L 63/0823; H04L 63/105; H04L 63/166; H04L 63/0892
See application file for complete search history.

(56) References Cited

U.S. PATENT DOCUMENTS

| | | | |
|---|---|---|---|
| 7,917,758 B2 | 3/2011 | Palekar et al. | |
| 8,910,261 B2 | 12/2014 | Sheth et al. | |
| 9,185,091 B2 | 11/2015 | Leibovitz et al. | |
| 9,762,579 B2 | 9/2017 | Sakura et al. | |
| 2009/0158392 A1* | 6/2009 | Hughes | H04L 63/08 726/3 |
| 2014/0068707 A1* | 3/2014 | Sakura | H04L 63/08 726/1 |
| 2018/0167812 A1* | 6/2018 | Nagarajamoorthy | H04W 76/14 |

OTHER PUBLICATIONS

Winter, S. et al., Radius Over TCP/TLS (RadSec), (Research Paper), Aug. 22, 2008, 17 Pgs.

* cited by examiner

*Primary Examiner* — Amie C. Lin
(74) *Attorney, Agent, or Firm* — Nolte Lackenbach Siegel (57) ABSTRACT

A method may include receiving a digital certificate through a secure connection from a network access server, the secure connection passing through a network address translation device, validating the digital certificate with a policy management system, and establishing a secure tunnel between the network access server and the policy management system when the digital certificate is validated. Also, receiving, through the secure tunnel and from the network access server, a remote authentication dial-in user service access request having a network access server internet protocol address, validating the network access server with the network access server internet protocol address by the policy management system, and allowing a remote authentication dial-in user service traffic when the internet protocol address of the network access server is validated and closing the secure tunnel when the validating the network access server fails.

20 Claims, 7 Drawing Sheets

MULTIPLE LEVEL VALIDATION

BACKGROUND

Networks may include a number of resources for network access servers to access. To manage access to the resources, and thereby prevent unauthorized access to the resources, network access server credentials may require validation. Network access servers may send requests to gain access to a particular network resource using access credentials. The access credentials may be passed through network access server devices and then to particular servers using varying types of protocols. Network access servers may then be granted access to network resources when the access credentials are verified or denied access to network resources when the access credentials are not verified. As such, network resources may be secured against access from nonauthorized network access servers.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Networks may include a number of network access servers that attempt to connect to network resources. Network access server may vary based on the type of network and may include, for example, servers, connection initiators, request initiators, as well as other computing devices. To manage access to network resources various hardware and software devices may be employed including, for example, network address translation devices, policy management systems, and the like. Network address translation devices may be used as firewalls or may be part of a firewall, which is used to prevent unwanted network access servers from accessing the network. For example, a network address translation device may receive a request to access resources within a network. The network access server may be requesting access from a public network, such as the Internet, to gain access to a private network that is protected by the network address translation device.

When the request is made, if the network address translation device allows the network access server to access the private network, access to resources within the private network may be further secured by a policy management system. The policy management system may be used to authenticate and authorize a user's access to the network. Authentication confirms the identity of the network access server, thereby allowing the network access server to access components of the network. Authorization determines whether the network access server is authorized to access specific resources in the network. Thus, even when a network access server gains access to the private network through the network address translation device, the network access server may still be authenticated and authorized prior to gaining access to network resources.

When a network access server is allowed to directly communicate with the policy management system, the network access server may provide the policy management system a network access server internet protocol address ("IP address"). However, when a network address translation device is used, rather than provide the network access server IP address to the policy management system, the IP address for the network address translation device is provided. As such, the policy management system does not know the IP address for the network access server. In such situations, the policy management system is not able to automatically authenticate the network access server. Rather a network administrator either authenticates the network access server or the network administrator configures the policy management system for each of the network access servers.

To allow the policy management system to authenticate individual network access servers, implementations of the present disclosure may provide methods and systems that use a multiple step validation process. In order to validate a network access server through a network address translation device with a policy management system, a digital certificate is received through a secure connection that is provided by the network address translation device. the secure connection may include, for example, a transport layer security ("TLS") connection. The digital certificate may include basic attributes about the network access server such as, for example, a serial number for the network access server, an issuer for the network access server, a common name, a subject alternative name, and the like. The digital certificate may be passed to the policy management system, and the policy management system may either validate or reject the network access server request.

When the policy management system validates the network access server based on the basic attributes in the digital certificate, the policy management system establishes a secure tunnel between the network access server and the policy management system. The secure tunnel may be a TLS connection directly between the network access server and the policy management system. The network access server may then send an access request including the network access server IP address to the policy management system. The policy management system may then use the IP address to read a validation level from a configuration database and validate the network access server. If the network access server is validated, the secure tunnel may remain open, thereby allowing information to be sent between the network access server and the policy management system, thereby allowing the network access server access to the network. When the network access server is not validated, the secure tunnel is closed, and no further communication occurs directly between the network access server and the policy management system without starting the validation process over.

The multiple step validation of network access servers within networks protected by network address translation devices may thereby allow policy management systems to authenticate and authorize network access servers without network administrator intervention. A detailed description of the process is provided below with respect to FIGS. 1-7.

Figure 1:
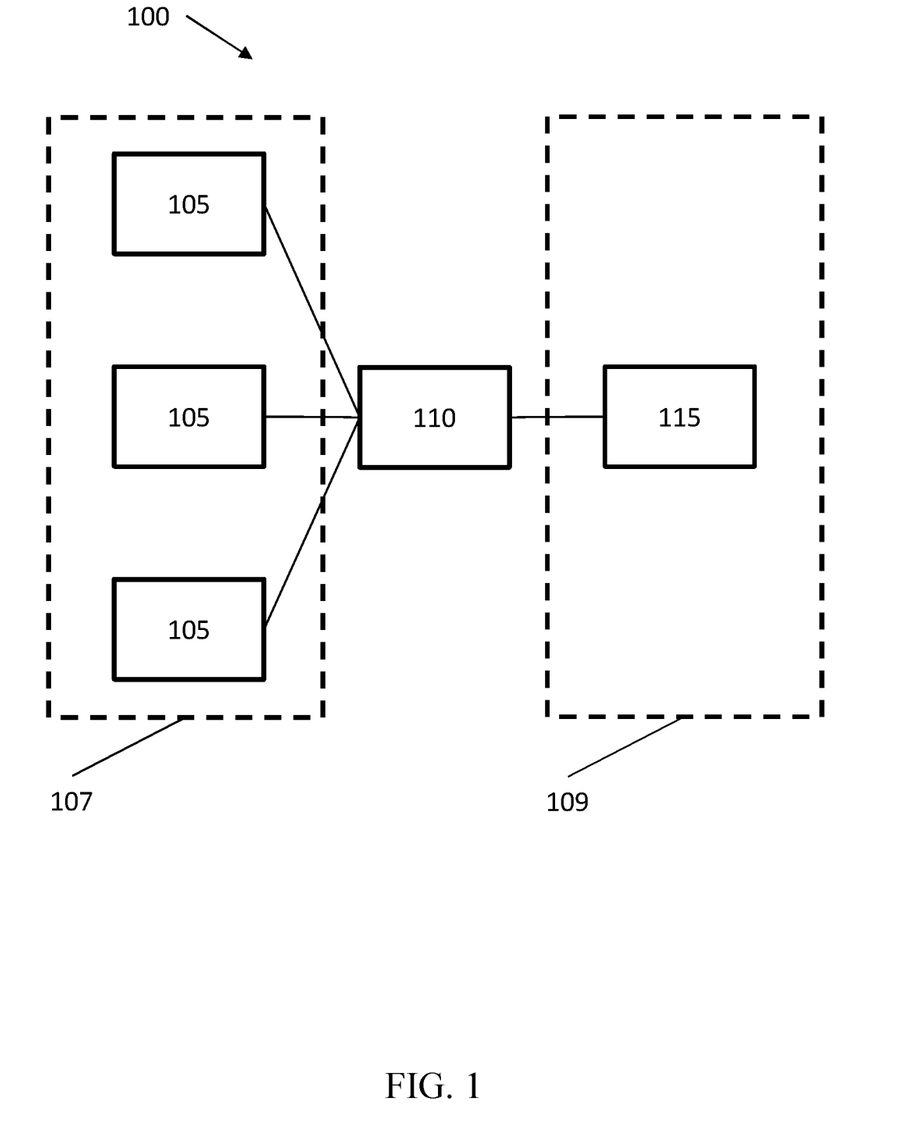
FIG. 1 is a schematic representation of a network access scenario, according to one or more examples of the disclosure.

Turning to FIG. 1, a schematic representation of a network access scenario, according to one or more examples of the disclosure is shown. In this network access scenario, a network 100 may include multiple network access servers 105 that connect through a network address translation device 110 to a policy management system 115. Network access servers 105 may include various clients, such as, for example, network access servers. Network access servers may include computing devices that act as a gateway to guard access to protected resources. As such, network access servers may enable an Internet service provider ("ISP") to provide customers with Internet access, provide access to telephone networks, other computing device, etc. Thus, in certain examples, network access servers 105 may include network access servers, while in other examples, network access servers may receive requests from numerous clients and forward the requests for access to computing resources.

Network access servers 105 may connect to policy management system 115 through one or more network address translation devices 110. In this example, three network access servers 105 are illustrated connecting to policy management system 115 through one or more network address translation device 110. In other implementations hundreds or thousands of network access servers 105 may attempt to connect to policy management system 115. Network address translation device 110 may include, for example, devices that include a firewall, a load balancer, and/or other devices that allow the same set of IP addresses to be reused in different parts of network 100. For example, incoming and outgoing traffic may pass through network address translation device 110, which acts as an agent between a public network 107 and a private network 109, thereby allowing a single unique IP address to represent a group of computing devices. In this example, network address translation device 110 may receive traffic from network access servers 105 and assign a single IP address to represent the three network access servers 105.

The policy management system 115 may include functionality to manage network policies, automatically configure devices, distribute security certificates, admit users, access computing device health, share information with third parties, and the like. In one example, policy management system 115 may include functionality to serve as a TLS server. As such, a TLS connection may be established between policy management system 115 and network address translation device 110, thereby allowing policy management system 115 to validate network access servers 105. A TLS connection is a cryptographic protocol that provides end-to-end communication security with network 100, thereby allowing two or more parties to exchange information in a secure channel. Validation may occur in several levels including, for example, basic validation, common name or subject alternative name ("CN/SAN") validation, or a validation check based on RFC6614, which is a check based on a request for comments from the Internet Engineering Task Force ("IETF").

Basic validation may include network address translation device 110 providing limited information about network access server 105 to policy management system 115, such as, for example, a serial number for network address translation device 110, an issuer number, or some other basic attributes of network address translation device 110. The attributes of network access server 105 may be provided in the form of a digital certificate. CN/SAN validation may include the policy management system 115 checking if the domain for network address translation device 110 is found, and if it is, providing a connection. A validation check based on RFC6614 may include a transport profile for a remote authentication dial-in user service ("RADIUS") using TLS over a transmission control protocol ("TCP") as the transport protocol. In certain examples, other types of validation may also occur, such as checking if network address translation device 110 is on a trusted device list, a certificate revocation list, a validity list, and the like.

As briefly discussed above, in certain implementations, when network access servers 105 attempt to access resources in network 100 while passing through network address translation device 110, policy management system 115 may only receive the IP address for network address translation device 110. As such, policy management system 115 may not be able to access the IP address for individual network access servers 105, thereby preventing policy management system 115 from validating network access servers 105. To validate network access servers 105, a multiple step validation process may be used to provide basic information about network access servers 105 to policy management system 115 and then, if the network access server 105 is validated, provide the IP address for the network access server 105 to the policy management system 115. Policy management system 115 may then validate the IP address of the network access server 105, thereby allowing a validated network access server 105 to access requested resources. The process will be described in detail below with respect to the following FIGs.

Figure 2:
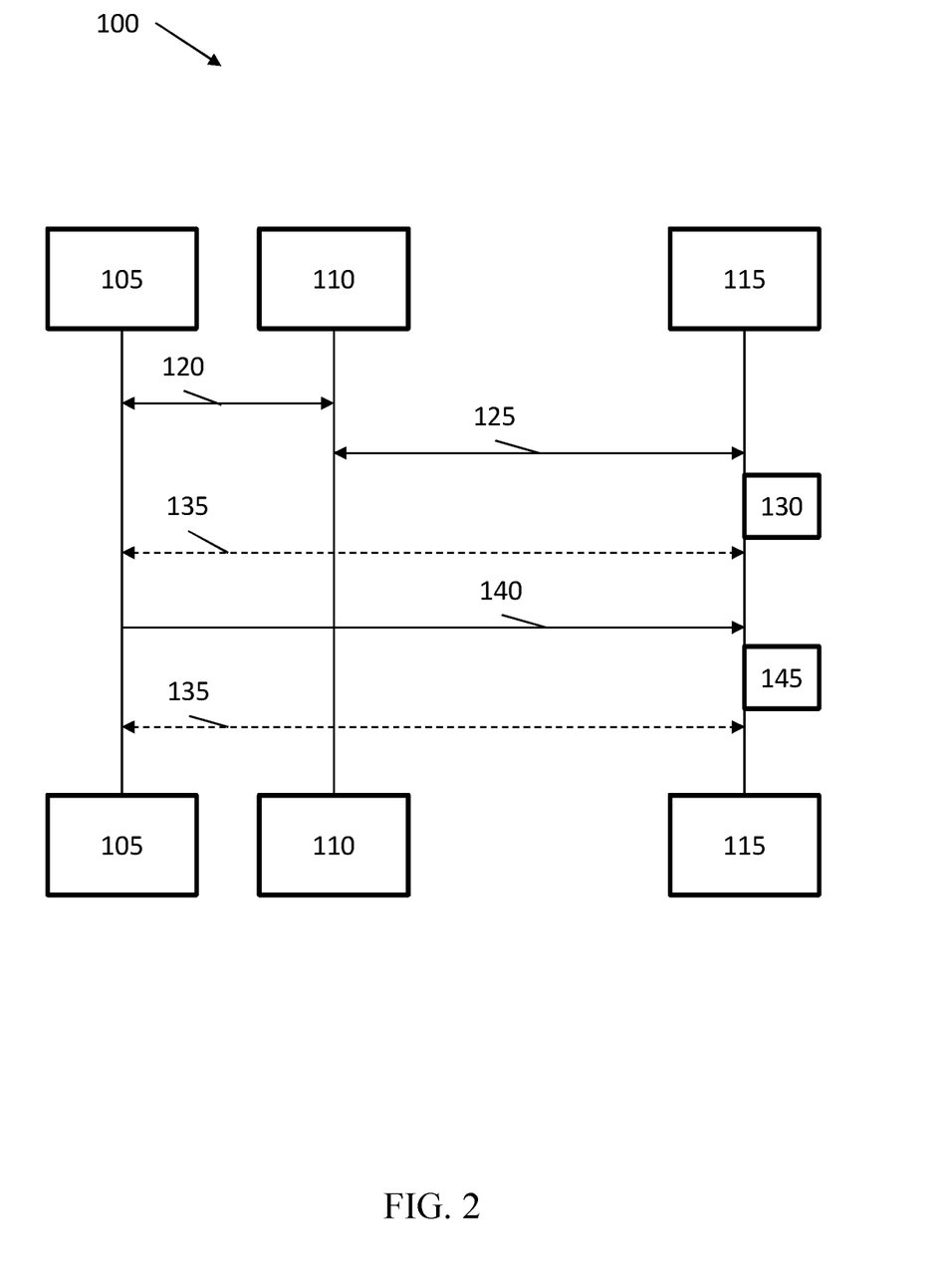
FIG. 2 is a process flow diagram for validating network access server access to a network, according to one or more examples of the disclosure.

Turning to FIG. 2, a process flow diagram for validating network access server access to a network, according to one or more examples of the disclosure is shown. In this example, network 100 may include one or more users 105, network address translation device 110, and policy management system 115. The process flow for authenticating network access server 105 accessing resources through network address translation device 110 being validated by policy management system 115 is illustrated.

Initially, a TLS connection 120 may be established between network access server 105 and network address translation device 110. Network address translation device 110, such as a firewall, may check whether network access server 105 is allowed to access other portions of network 100. A TLS connection 125 may then be established between network address translation device 110 and policy management system 115. When the TLS connection 125 is established, basic certification information may be provided about network access server 105 to policy management system 115. Basic certification information may include policy management system 115 receiving a digital certificate and checking whether the digital certificate is valid, e.g., signed by a trusted source, not expired, on a trusted device list, not part of a revocation list, etc. When the digital certificate is validated, policy management system 115 may cache 130 certain attributes from the digital certificate. For example, policy management system 115 may cache 130 properties about network access server 105, such as a serial number, an issuer/signer name, a CN/SAN, or other information that may be later be used to verify network access server 105.

After basic validation occurs, a secure tunnel, such as an inside TLS tunnel 135 may be formed between network access server 105 and policy management system 115. Inside TLS tunnel 135 may include an encrypted bidirectional connection for data to travel between network access server 105 and policy management system 115. Once inside TLC tunnel 135 is established, network access server 105 may send a RADIUS access request 140 to policy management system 115. RADIUS access request 140 may include the IP address for network access server 105. With the IP address for network access server 105, policy management system 115 may validate 145 network access server 105. Validation 145 of network access server 105 may include, for example, looking up a device configuration for network access server 105, and based on the device configuration, checking the CN/SAN for the device. Validation 145 may also include checking the validity of network access server 105 based on RFC661 or validating 145 network access server 105 based on other attributes provided by a network administrator.

When network access server 105 is validated 145 by policy management system 115, RADIUS traffic may be allowed to continue within inside TLS tunnel 135. When network access server 105 is not validated 145 by policy management system 115, policy management system 115 may close inside TLS tunnel 135, thereby preventing network access server 105 from accessing resources.

The multiple step process for validating network access servers 105 may occur for each network access server 105 within network 100. As such, separate inside TLS tunnels 135 may be created between policy management system 115 and each network access server 105. Similarly, policy management system 115 may cache 130 information about each network access server 105 within network 100 separately. Once network access server 105 is validated and RADIUS traffic is allowed inside TLS tunnel 135, RADIUS traffic may continue until inside TLS tunnel 135 is closed. As long as TLS tunnel 135 remains open, no further validation between policy management system 115 and network access server 105 occurs. Said another way, the validation process described above only occurs once for the first RADIUS access request 140 that occurs for each new inside TLS tunnel 135.

Figure 3:
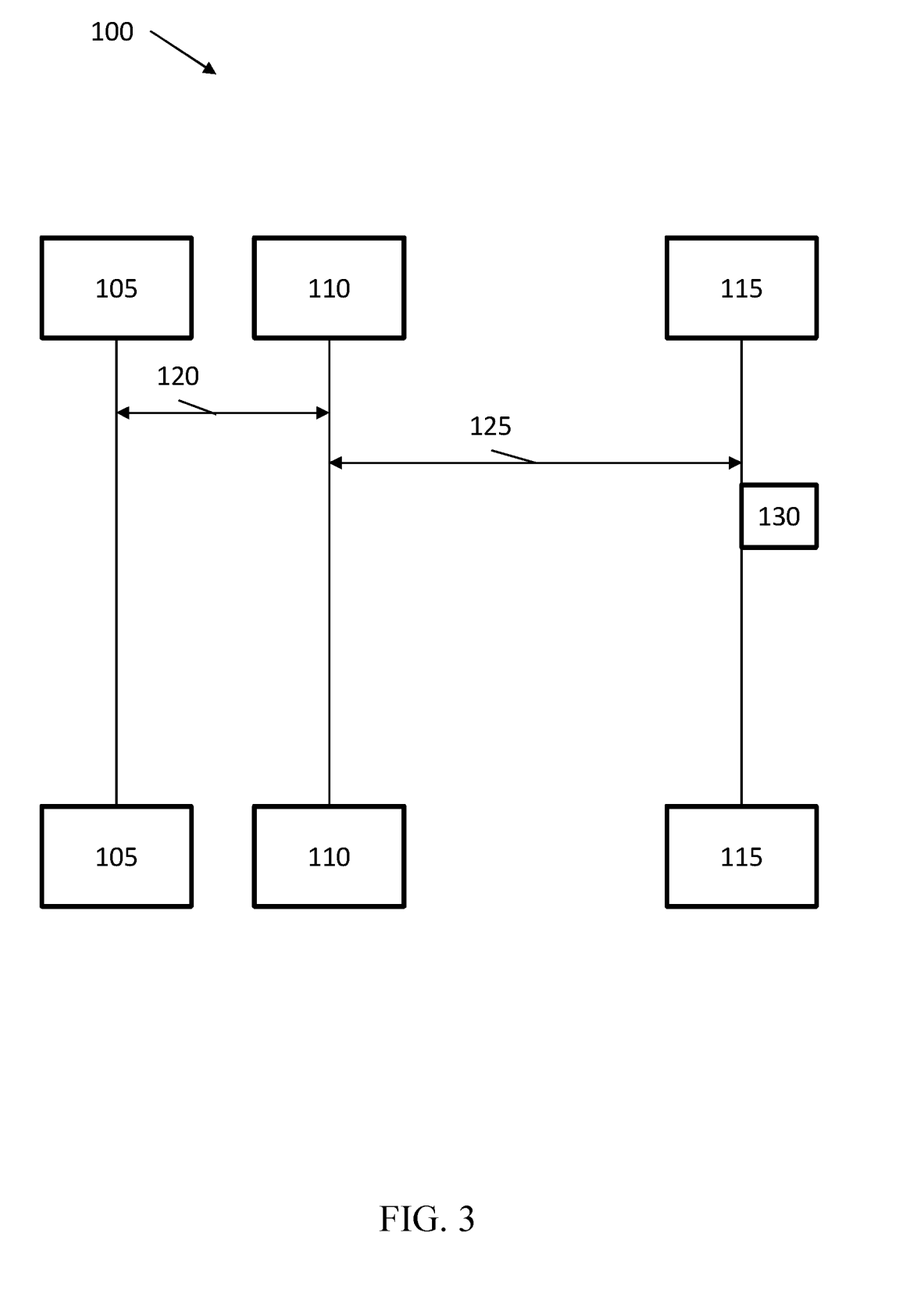
FIG. 3 is a process flow diagram for validating network access server access to a network that results in denial of access by a policy management system, according to one or more examples of the disclosure.

Turning to FIG. 3, a process flow diagram for validating network access server access to a network, according to one or more examples of the disclosure is shown. In this example, network 100 may include one or more users 105, network address translation device 110, and policy management system 115. The process flow for authenticating network access server 105 accessing resources through network address translation device 110 being validated by policy management system 115 is illustrated.

In this example, a TLS connection 120 is established between network access server 105 and network address translation device 110. If network address translation device 110, such as a firewall, permits the connection to continue, a TLS connection 125 is established between network address translation device 110 and policy management system 115. Network address translation device 110 may provide basic certification information in the form of a digital certificate about network access server 105 to policy management system 115. Policy management system 115 may then verify attributes of the digital certificate. In this example, policy management system 115 rejects the basic certification because the digital certificate includes attributes that do not allow a connection between network access server 105 and policy management system 115 to be formed.

For example, the digital certificate may be expired, and as such, network access server 105 cannot be verified. In other examples, digital certificate may include attributes that policy management system 115 determines makes network access server 105 not a trusted device. For example, the digital certificate may be on a certificate revocation list, may not match an online certificate status protocol, may not be on a trusted devices list, or may otherwise include attributes that causes policy management system 115 to reject access to network access server 105.

When network access server 105 cannot be verified, no further connections are allowed between network access server 105 and policy management system 115 until the attribute of digital certification that caused the rejection is remediated. For example, network access server 105 may procure a corrected digital certificate, when may then be used in subsequent access requests. In certain implementations, aspects of network access server 105 may be cached 130, as explained above However, in other implementations, aspects of network access server 105 may not be stored by policy management system 115, as no further action will be taken between network access server 105 and policy management system 115 until the digital certificate is corrected.

Figure 4:
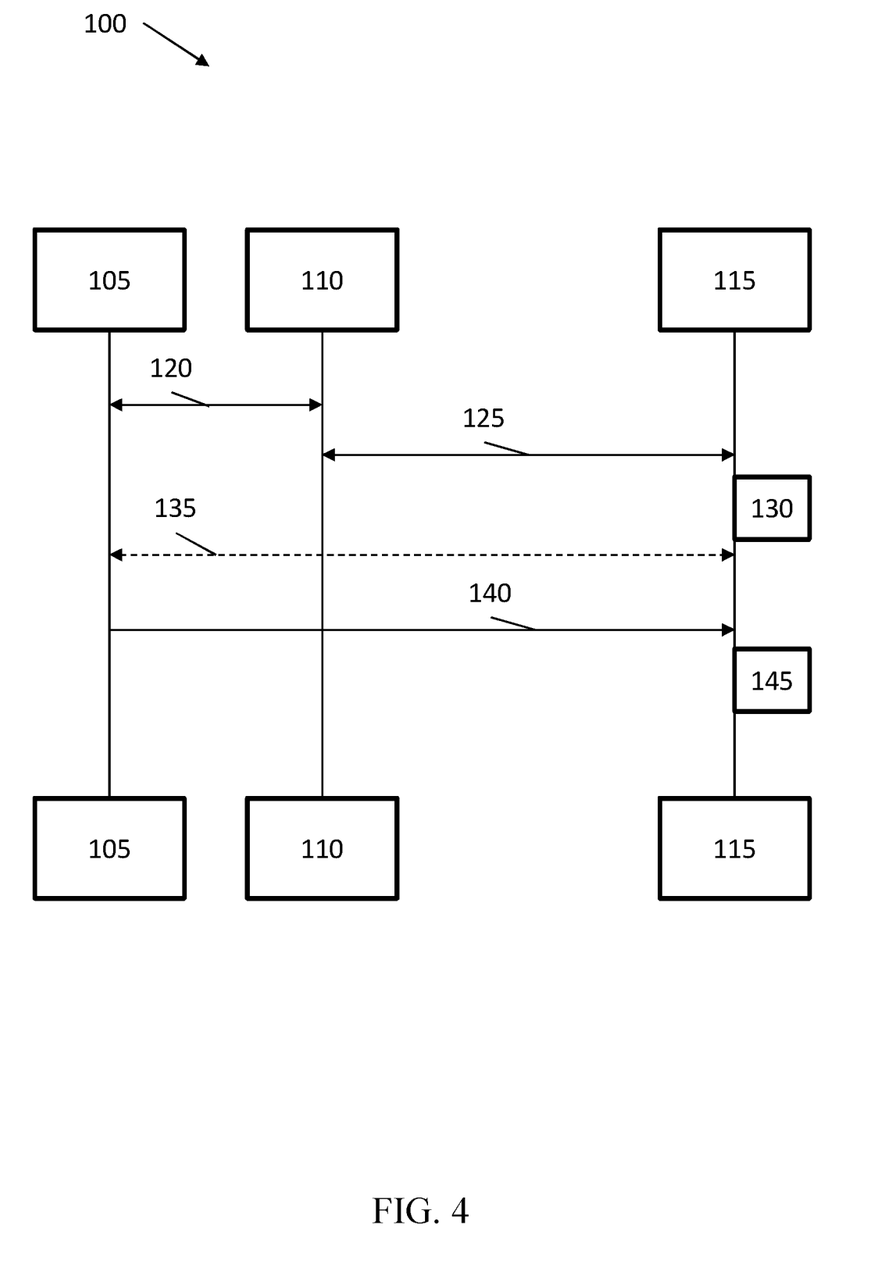
FIG. 4 is a process flow diagram for validating network access server access to a network that results in network access server rejection by a policy management system, according to one or more examples of the disclosure.

Turning to FIG. 4, a process flow diagram for validating network access server access to a network, according to one or more examples of the disclosure is shown. In this example, network 100 may include one or more users 105, network address translation device 110, and policy management system 115. The process flow for authenticating network access server 105 accessing resources through network address translation device 110 being validated by policy management system 115 is illustrated.

In this example, a TLS connection 120 is established between network access server 105 and network address translation device 110. If network address translation device 110 pass through network access server 105 a TLS connection 125 is established between network address translation device 110 and policy management system 115. Basic verification may occur as explained above in detail with respect to FIG. 2.

When network access server 105 is verified by policy management system 115, inside TLS tunnel 135 may be established between network access server 105 and policy management system 115. Network access server 105 may then send RADIUS access request 140 to policy management system 115. RADIUS access request 140 may include the IP address for network access server 105. In this example, policy management system 115 uses the IP address to lookup a device configuration for network access server 105. Policy management system 115 may then determine that network access server 105 is not validated 145, and close inside TLS tunnel 135. As such, no RADIUS traffic other than the first RADIUS access request 140 is allowed between network access server 105 and policy management system 115.

Network access server 105 may be denied further access for a variety of reasons. For example, policy management system 115 may compare information in the device configuration to a serial number for network access server 105. Policy management system 115 may further compare information in the device configuration to an issuer, perform a CN/SAN check, perform a check according to RFC6614, or perform other checks of network access server 105. In certain implementations, more than one of the above verification steps may be used, while in other implementations a single verification step may be performed after receiving the IP address for network access server 105. Information about network access server 105, such as serial number, CN/SAN, etc., may be cached 130, as described above. As such, policy management system 115 may perform the comparison based on information provided in the basic certification verification. However, in other implementations, the information used to validate network access server 105 after network access server 105 IP address is received may be provided from previously received information or information otherwise available to policy management system 115.

Figure 5:
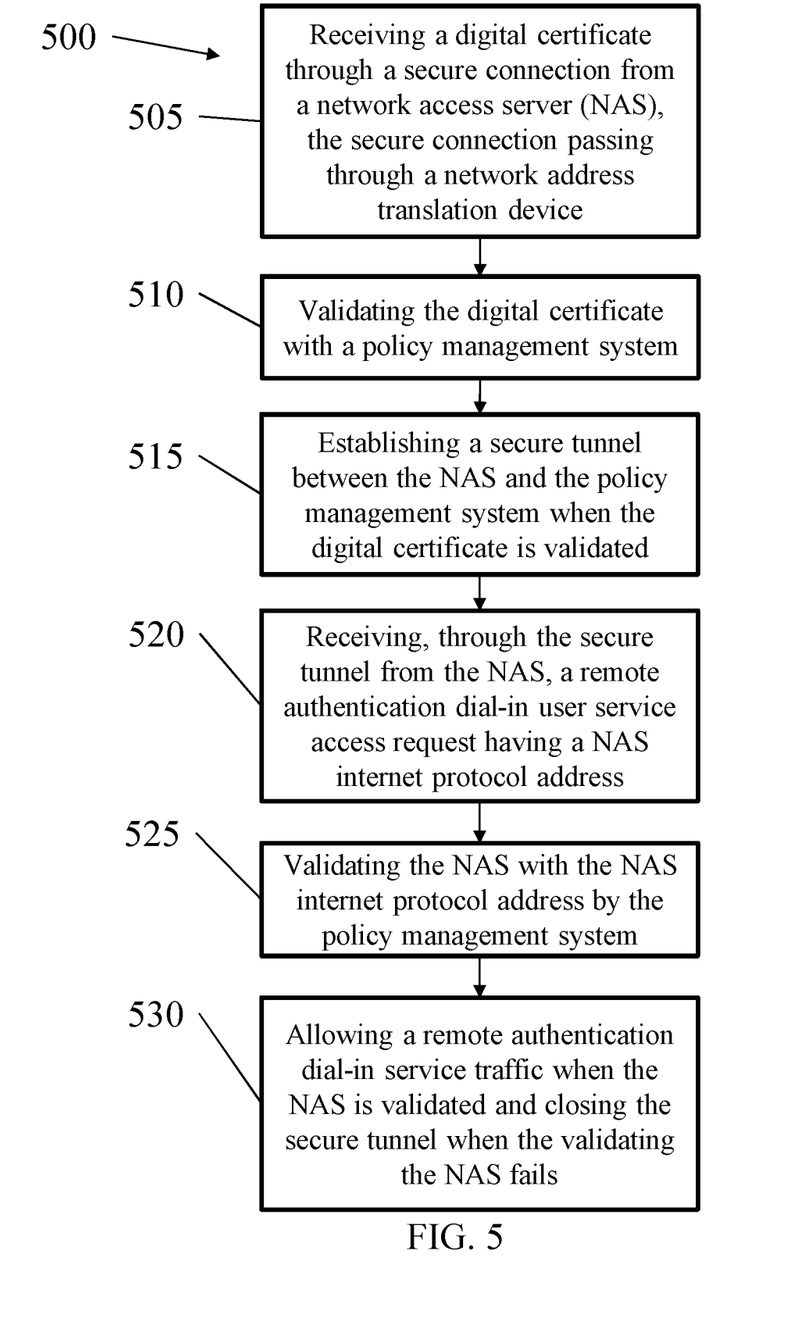
FIG. 5 is a flowchart depicting a method for client validation, according to one or more examples of the disclosure.

Turning to FIG. 5, a flowchart depicting a method for client validation, according to one or more examples of the disclosure is shown. In operation, method 500 may include receiving (block 505) a digital certificate through a secure connection from a network access server, the secure connection passing through a network address translation device. In certain implementations, the network address translation device may include a firewall or other device and/or software implementation to restrict access between a public network, e.g., the Internet, and a private network.

The network address translation device may allow access to other aspects of a network if the network access server has proper permissions. For example, network address translation device may reject the network access server due to a network access server IP address. In other implementations, the network access server may be on a list that prevents the network access server from accessing other aspects of the network. The network address translation device may pass the digital certificate to other devices within the network, and in so doing, the IP address associated with the digital certificate may be the IP address of the network address translation device, not the IP address of the network access server.

Method 500 may further include validating (block 510) the digital certificate with a policy management system. The policy management system may include operational functionality as described in detail with respect to FIG. 1. In the initial validation phase, attributes of the network access server in the digital certificate may be examined by the policy management system to determine whether to establish a connection between the network access server and the policy management system. For example, the policy management system may compare an attribute of the digital certificate against a trusted devices list. In other implementations, the policy management system may compare an attribute of the digital certificate according to an online certificate status protocol, compare the digital certificate against a certificate revocation list, or perform another initial validation check.

When the policy management system determines that the network access server cannot be verified, no further action is taken, and no further connections are provided between the network access server and the policy management system. Reasons for not allowing further connections and not validating the network access server may include determining that the digital certificate is expired or includes incorrect information. Additionally, the network access server may be on a list of devices that are not trusted or may not meet other credentials of the policy management system. The reasons for not allowing connections may be provided to the policy management system by a system administer and may be updated as network conditions change.

If the digital certificate results in validation of the network access server by policy management system, the policy management system may cache or otherwise store network access server attributes, which may be contained within the digital certificate. For example, digital certificate may include a serial number for the network access server, an issuer or signer for the network access server, a common name, a subject alternative name, other attributes that are associated with the network access server or may otherwise be used to identify the network access server. If the network access server is not verified, the information contained in the digital certificate may be cached to identify potential outside threats or may otherwise be deleted or not stored in the policy management system.

Method 500 may further include establishing (block 515) a secure tunnel between the network access server and the policy management system when the digital certificate is validated. The secure tunnel may include an inside TLS tunnel that allows direct communication between the network access server and the policy management system. The TLS tunnel is bidirectional, thereby allowing two-way communication between the network access server and the policy management system. Different secure tunnels may be established for each network access server that contacts the policy management system. As such, each secure tunnel may be operated independently, thereby controlling the flow of information between each network access server and the policy management system.

Method 500 may further include receiving (520), through the secure tunnel from the network access server, a RADIUS access request having a network access server IP address. Because there is the secure tunnel providing a connection between the network access server and the policy management system, the policy management system will see the IP address of the network access server rather than the IP address of the network address translation device. The RADIUS access request may include the first communication from the network access server to the policy management system through the secure tunnel. At this point in the process, the network access server does not have access to network resources, pending a determination of the validity of the network access server.

Method 500 may further include validating (block 525) the network access server with the network access server IP address by the policy management system. The second phase of validation occurs after the policy management system can see the IP address of the network access server. Without the network access server IP address, the policy management system may not be able to determine which network access server is attempting to connect to the policy management system due to the secure connection passing through the network address translation device. Validating the network access server may include using the network access server IP address to lookup a configuration file for the network access server device and comparing attributes of the network access server to known information about the network access server. In certain implementations, the validating may include comparing the network access server internet protocol address to a validation configuration of the policy management system. For example, the policy management system may include information about the network access server that may be used to confirm validation of the network access server. The validation configuration may further be used to match the IP address of the network access server to corresponding information that is stored on or otherwise accessible to the policy management system.

In one implementation, information about the network access server that was previously cached from the digital certificate may be used to validate the network access server. For example, the serial number for the network access server, the issuer/signer for the network access server, a CN or SAN, and/or other attributes of the network access server may be used during validation. In certain implementations, information about the network access server may be stored in the policy management system, while in other implementations, information about the network access server may be accessible by the policy management system through one or more third parties. In some examples, validation of the network access server may occur through processes defined in RFC6614.

Method 500 may further include allowing (block 530) RADIUS traffic when the network access server is validated and closing the secure tunnel when the validating the network access server fails. When the network access server is validated, the secure tunnel is allowed to remain open, thereby allowing RADIUS traffic to pass through the secure tunnel. Subsequent validations of network access server are not necessary as long as the secure tunnel remains open, as the network access server has been successfully verified. However, when the secure tunnel is closed, any subsequent connection requests would pass through the same process described above in blocks 505-530. Thus, the validation process described above occurs for the first RADIUS access request for each secure tunnel that is created between a network access server and the policy management system.

When validation is not successful, the policy management system may close the secure tunnel, thereby preventing the network access server from accessing system resources. By closing the secure tunnel, the network access server is not allowed to access the policy management system and/or any other aspects of the network without going through the validation process described above in blocks 505-530.

Figure 6:
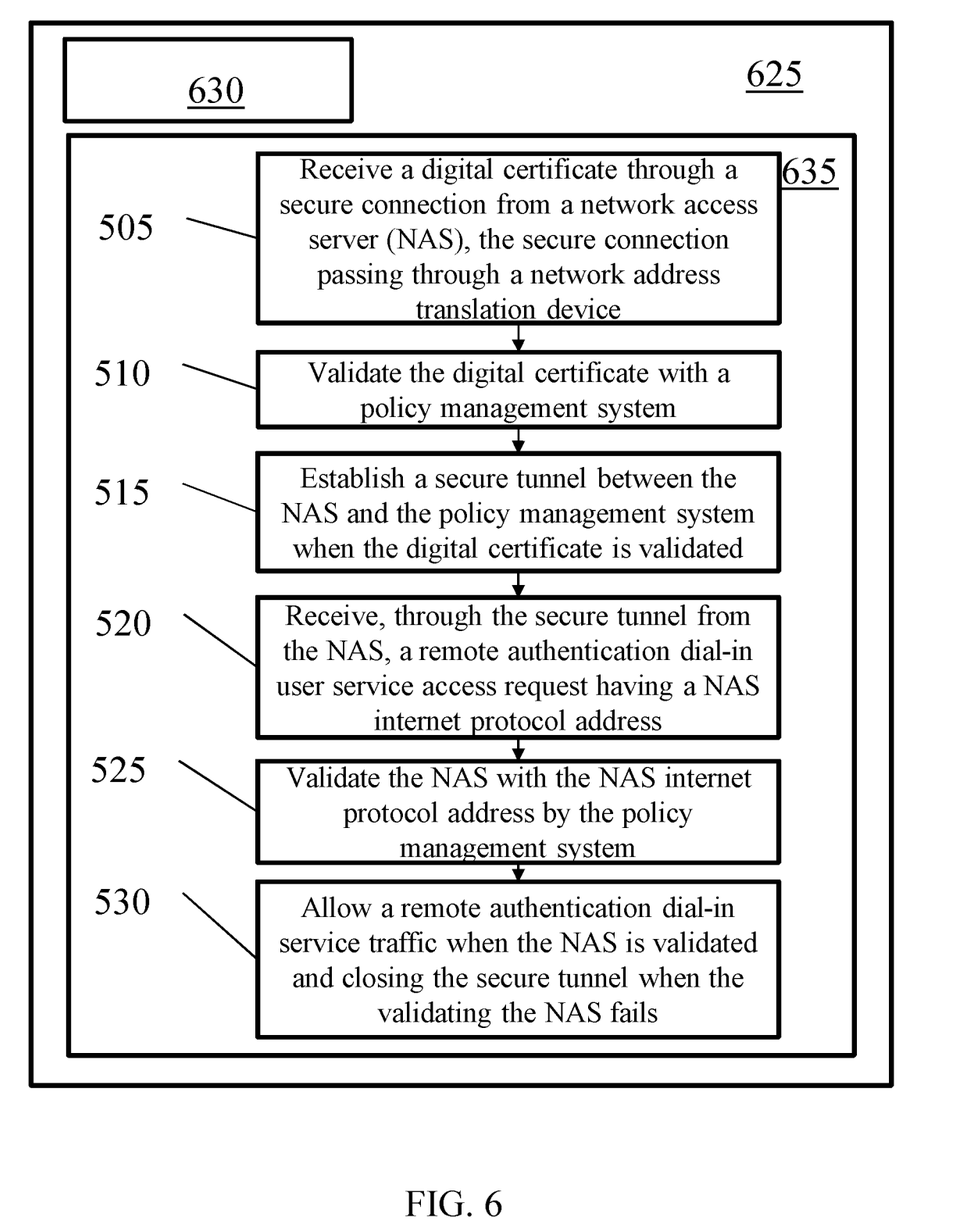
FIG. 6 is an example computing device with a hardware processor and accessible machine-readable instructions, according to one or more examples of the disclosure.

Turning to FIG. 6, an example computing device with a hardware processor and accessible machine-readable instructions, according to one or more examples is shown. FIG. 6 provides an example computing device 625, with a hardware processor 630, and accessible machine-readable instructions stored on a machine-readable medium 635 for validating network access servers with respect to one or more disclosed example implementations. FIG. 6 illustrates computing device 625 configured to perform the flow described in blocks 505, 510, 515, 520, 525, and 530, discussed in detail with respect to FIG. 5. However, computing device 625 may also be configured to perform the flow of other methods, techniques, functions, or processes described in this disclosure.

A machine-readable storage medium, such as 465 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 7:
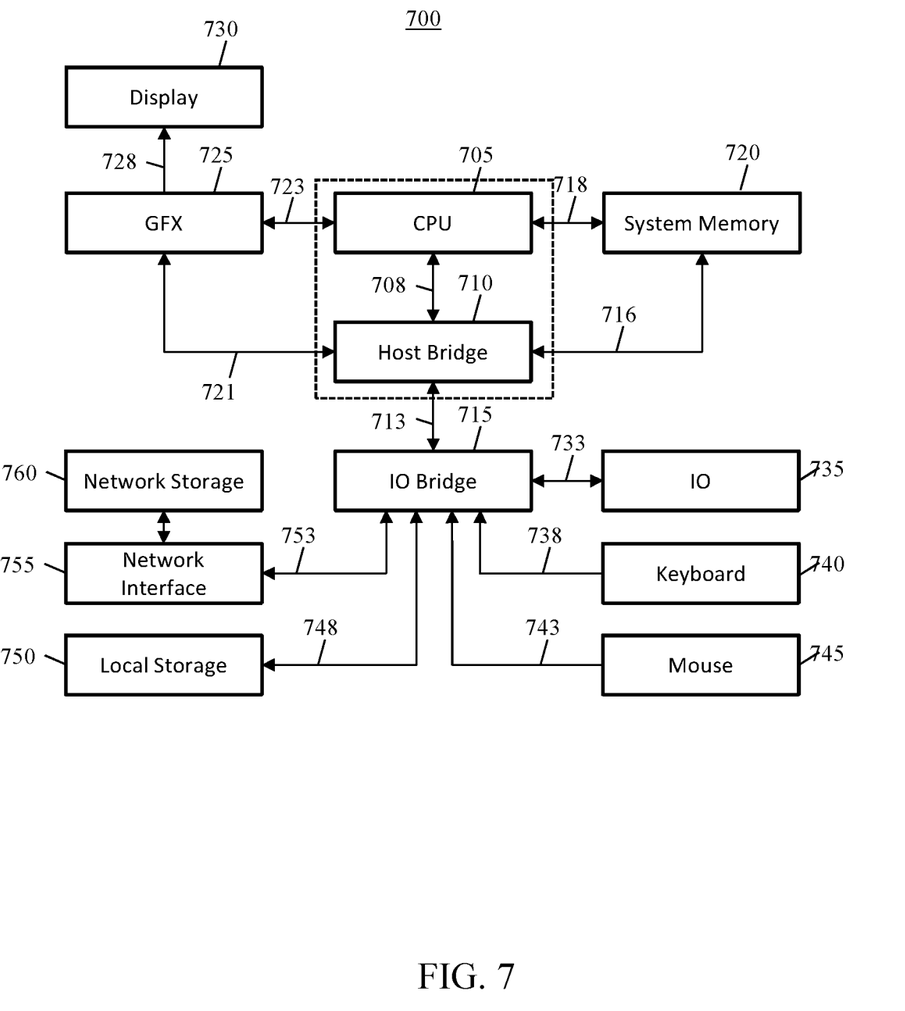
FIG. 7 is a schematic representation of a computer processing device that may be used to implement functions and processes, according to one or more examples of the present disclosure, according to one or more examples of the disclosure.

Turning to FIG. 7, a schematic representation of a computer processing device 700 that may be used to implement functions and processes in accordance with one or more examples of the present disclosure is shown. FIG. 7 illustrates a computing system 700 that may be used to implement the systems, methods, and processes of this disclosure. For example, computing system 700 illustrated in FIG. 7 could represent a client device or a physical server device and include either hardware or virtual processor(s) depending on the level of abstraction of the computing device. In some instances (without abstraction), computing system 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. Similarly, the validation tool used by the subscriber may include a software solution that runs on such a computing system 700.

FIG. 7 shows a computing system 700 in accordance with one or more examples of the present disclosure. Computing system 700 may be used to implement aspects of the present disclosure. Computing system 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain examples, CPU 705 may integrate the functionality of GFX 725 and interface directly (not shown) with display 730. Host bridge 710 may include an interface 708 to CPU 705, an interface 713 to 10 bridge 715, for examples where CPU 705 does not include interface 718 to system memory 720, an interface 716 to system memory 720, and for examples where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. 10 bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi®, Bluetooth®, or any other network protocol suitable to facilitate networked communications. Computing system 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing system 700 and may be accessible to computing system 700 via one or more network interfaces provided by one or more network interface devices 755.

One of ordinary skill in the art will recognize that computing system 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, 10 bridge 715, or ASICs or various sub-sets, super-sets, or combinations of functions or features thereof, may be integrated, in whole or in part, or distributed among various devices in a way that may vary based on an application, design, or form factor in accordance with one or more example examples. As such, the description of computing system 700 is merely an example and not intended to limit the type, kind, or configuration of components that constitute a computing system suitable for performing computing operations, including, but not limited to, hashing functions. Additionally, one of ordinary skill in the art will recognize that computing system 700, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example examples.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for client validation, the method comprising:
receiving, by a policy management system, a digital certificate through a secure connection between the policy management system and a network access server that provides the digital certificate to the policy management system, wherein the secure connection passes through a network address translation device other than the network access server and other than the policy management system, and the digital certificate contains information about the network access server;
validating, by the policy management system, the digital certificate;
establishing, by the policy management system, a secure tunnel between the network access server and the policy management system responsive to validation of the digital certificate;
receiving, by the policy management system, through the established secure tunnel and from the network access server, a remote authentication dial-in user service access request having a network access server internet protocol address;
validating, by the policy management system, the network access server with the network access server internet protocol address received from the network access server by the policy management system; and
allowing, by the policy management system, a remote authentication dial-in user service traffic responsive to the internet protocol address of the network access server being validated and closing the secure tunnel responsive to validation of the network access server failing.

2. The method of claim 1, further comprising:
caching an attribute from the digital certificate in the policy management system.

3. The method of claim 1, further comprising a plurality of secure tunnels, wherein each of the plurality of secure tunnels is for a different network access server.

4. The method of claim 1, wherein the method occurs for a first remote authentication dial-in user service traffic request for the secure tunnel between the network access server and the policy management system.

5. The method of claim 1, wherein the validating the network access server with the network access server internet protocol address by the policy management system comprises reading a validation level from a configuration database.

6. The method of claim 1, wherein the secure tunnel is a transport layer security tunnel.

7. The method of claim 1, wherein the validating the network access server comprises comparing the network access server internet protocol address to a validation configuration of the policy management system.

8. The method of claim 1, wherein the validating the network access server with the network access server internet protocol address by the policy management system comprises looking up a device configuration based on the network access server internet protocol address and comparing an attribute of the network access server to the device configuration.

9. The method of claim 1, wherein the validating the network access server with the network access server internet protocol address by the policy management system comprises performing a common name or subject alternative name check.

10. The method of claim 1, wherein the secure connection comprises a transport layer security connection.

11. The method of claim 1, wherein the digital certificate comprises at least one of a network access server serial number, an issuer, a common name, and a subject alternative name.

12. The method of claim 1, wherein a network address translation device internet protocol address is passed through the secure connection to the policy management system with the digital certificate.

13. The method of claim 1, further comprising rejecting the network access server when the validating the digital certificate fails.

14. The method of claim 1, wherein the network address translation device is at least one of a firewall and a load balancer.

15. A computer system, comprising:
a processor; and
a memory communicatively coupled to the processor, the memory storing instructions, that when executed by the processor, cause the processor to:
receive a digital certificate through a secure connection between the computer system and a network access server that provides the digital certificate to the computer system, the secure connection passing through a network address translation device separate from the computer system and separate from the network access server, and the digital certificate contains information about the network access server;
validate the digital certificate with the computer system;
establish a secure tunnel between the network access server and the computer system responsive to the digital certificate being validated;
receive, through the established secure tunnel and from the network access server, a remote authentication dial-in user service access request having a network access server internet protocol address;
validate the network access server with the network access server internet protocol address received from the network access server by the computer system; and
allow a remote authentication dial-in user service traffic responsive to the internet protocol address of the network access server being validated and close the secure tunnel responsive to the validation of the network access server failing.

16. The computer system of claim 15, wherein the network address translation device is one of a firewall and a load balancer.

17. The computer system of claim 15, wherein the memory further stores instructions that, when executed by the processor, cause the processor to compare the network access server internet protocol address to a validation configuration of the policy management system.

18. A non-transitory computer readable medium comprising computer executable instructions stored thereon that, when executed by a processor in a policy management system, cause the processor to:
receive a digital certificate through a secure transport layer connection between the policy management system and a network access server that provides the digital certificate to the policy management system, wherein the secure transport layer connection passes through a network address translation device, the network address translation device is separate from the policy management system and is separate from the network access server, and the digital certificate contains information about the network access server;
validate the digital certificate with the policy management system;
establish a secure inside transport layer tunnel between the network access server and the policy management system responsive to the digital certificate being validated;
receive, through the established secure inside transport layer tunnel and from the network access server, a remote authentication dial-in user service access request having a network access server internet protocol address;
validate the network access server based on the network access server internet protocol address received from the network access server; and
allow, through the secure inside transport layer tunnel, a remote authentication dial-in user service traffic responsive to the network access server being validated and close the inside transport layer secure tunnel responsive to the validation of the network access server failing.

19. The non-transitory computer readable medium of claim 18, further comprising instructions to cache an attribute from the digital certificate in the policy management system.

20. The non-transitory computer readable medium of claim 18, further comprising instructions to compare the network access server internet protocol address to a validation configuration of the policy management system.

* * * * *